(12) United States Patent
Kinlen

(10) Patent No.: US 11,976,178 B2
(45) Date of Patent: May 7, 2024

(54) COMPOSITIONS WITH COATED CARBON FIBERS AND METHODS FOR MANUFACTURING COMPOSITIONS WITH COATED CARBON FIBERS

(71) Applicant: THE BOEING COMPANY, Chicago, IL (US)

(72) Inventor: Patrick J. Kinlen, Fenton, MO (US)

(73) Assignee: THE BOEING COMPANY, Arlington, VA (US)

( * ) Notice: Subject to any disclaimer, the term of this patent is extended or adjusted under 35 U.S.C. 154(b) by 115 days.

(21) Appl. No.: 15/792,349

(22) Filed: Oct. 24, 2017

(65) Prior Publication Data

US 2019/0119469 A1    Apr. 25, 2019

(51) Int. Cl.
*C08K 7/06*     (2006.01)
*C01B 32/174*    (2017.01)
(Continued)

(52) U.S. Cl.
CPC .............. *C08K 7/06* (2013.01); *C01B 32/174* (2017.08); *C01B 32/194* (2017.08); *C01B 32/21* (2017.08);
(Continued)

(58) Field of Classification Search
CPC .......... C08K 3/04; C08K 3/046; C08K 3/041; C08K 3/042; C08K 9/04; C08K 7/02;
(Continued)

(56) References Cited

U.S. PATENT DOCUMENTS 3,985,928 A * 10/1976 Watanabe .......... C08G 59/4042
                                                 442/146
4,061,812 A * 12/1977 Gilwee, Jr. .......... B29D 24/005
                                                   428/920
(Continued)

FOREIGN PATENT DOCUMENTS

CN     101403183 A    4/2009
CN     104987584 A    10/2015
(Continued)

OTHER PUBLICATIONS

Machine translation of JP05-195440A, published Aug. 1993. (Year: 1993).*

(Continued)

*Primary Examiner* — Monique R Jackson
(74) *Attorney, Agent, or Firm* — Patterson + Sheridan, LLP

(57) ABSTRACT

The present disclosure provides compositions including a carbon fiber material comprising one or more of an acyclic olefin group or a thiol disposed thereon; and a thermosetting polymer or a thermoplastic polymer. The present disclosure further provides metal substrates including a composition of the present disclosure disposed thereon. The present disclosure further provides vehicle components including a metal substrate of the present disclosure. The present disclosure further provides methods for manufacturing a vehicle component, including contacting a carbon fiber material with a carbon-containing zinc-titanium or a thiol to form a coated carbon fiber material; and mixing the coated carbon fiber material with a thermosetting polymer or a thermoplastic polymer to form a composition. Methods can further include depositing a composition of the present disclosure onto a metal substrate.

20 Claims, 5 Drawing Sheets

(51) Int. Cl.
  *C01B 32/194* (2017.01)
  *C01B 32/21* (2017.01)
  *C08J 5/06* (2006.01)
  *C08K 3/04* (2006.01)
  *C08K 9/04* (2006.01)
  *C09D 5/08* (2006.01)
  *C09D 7/62* (2018.01)
  *C23C 30/00* (2006.01)
  *D01F 11/12* (2006.01)
  *D01F 11/14* (2006.01)
  *D01F 11/16* (2006.01)

(52) U.S. Cl.
  CPC .............. *C08J 5/06* (2013.01); *C08K 3/04* (2013.01); *C08K 9/04* (2013.01); *C09D 5/08* (2013.01); *C09D 5/082* (2013.01); *C09D 5/084* (2013.01); *C09D 7/62* (2018.01); *C23C 30/00* (2013.01); *D01F 11/127* (2013.01); *D01F 11/14* (2013.01); *D01F 11/16* (2013.01); *C08J 2300/22* (2013.01); *C08J 2300/24* (2013.01); *C08J 2363/00* (2013.01); *C08J 2365/00* (2013.01); *C08J 2371/00* (2013.01); *C08J 2379/08* (2013.01)

(58) Field of Classification Search
  CPC ..... C08K 7/04; C08K 7/06; C08K 9/06; C08J 5/042; C08J 5/06; C08J 5/24; C08J 2333/24; C08J 2379/08; C08J 2329/12; C08J 2433/24; C08J 2479/08; C08J 2429/12; C08J 2371/00; C08J 2471/00; C08J 5/243; C08J 5/248; B32B 15/14; B32B 2262/106; B32B 2260/021; B32B 2260/023; B32B 2260/046; B32B 5/12; C09D 5/08; C09D 5/082; C09D 5/084; C09D 5/086; C09D 179/085; C08L 79/085

See application file for complete search history.

(56) References Cited

U.S. PATENT DOCUMENTS

| | | | | |
|---|---|---|---|---|
| 4,405,685 | A * | 9/1983 | Honjo | C04B 41/009 427/249.17 |
| 5,338,782 | A * | 8/1994 | Corley | C08G 59/40 528/109 |
| 6,114,050 | A * | 9/2000 | Westre | B32B 3/12 244/119 |
| 8,167,190 | B1 * | 5/2012 | Bullock | B23K 1/0008 228/119 |
| 8,328,977 | B2 | 12/2012 | Defoort et al. | |
| 8,399,064 | B2 * | 3/2013 | Schultz | C08J 5/06 427/407.1 |
| 2008/0213486 | A1 * | 9/2008 | Ronk | C09D 5/18 427/407.1 |
| 2008/0255332 | A1 * | 10/2008 | Defoort | D06M 14/36 526/273 |
| 2009/0280324 | A1 * | 11/2009 | Liang | D04H 1/732 156/166 |
| 2011/0247756 | A1 * | 10/2011 | Wilson | C08L 63/00 156/307.7 |
| 2012/0059198 | A1 * | 3/2012 | Zou | B82Y 40/00 568/930 |
| 2012/0097902 | A1 * | 4/2012 | Arifuku | H01B 1/22 252/510 |
| 2012/0123061 | A1 * | 5/2012 | Cheng | C08K 3/04 525/523 |
| 2012/0277360 | A1 * | 11/2012 | Scheffer | C08L 77/00 524/237 |
| 2013/0078515 | A1 * | 3/2013 | Reynolds | H01G 11/42 429/212 |
| 2014/0138587 | A1 * | 5/2014 | Pasquali | C01B 32/168 252/500 |
| 2016/0024310 | A1 * | 1/2016 | McMullin | C09D 5/084 428/418 |
| 2019/0040214 | A1 * | 2/2019 | Lim | C08J 5/06 |

FOREIGN PATENT DOCUMENTS

| | | | |
|---|---|---|---|
| JP | 05195440 A | * | 8/1993 |
| JP | 2014208459 A | | 11/2014 |
| WO | 2012080159 A1 | | 6/2012 |
| WO | 2013191809 A1 | | 12/2013 |

OTHER PUBLICATIONS

Riggs, Chapter 11. Graphite Fibers and Composites, Handbook of Composites, 1982, G. Lubin (ed.), pp. 196-271. (Year: 1982).*

Graphene, Wikipedia.org, retrieved from "https://en.wikipedia.org/w/index.php?title=Graphene&oldid=1012029983" on Mar. 22, 2021. ( Year: 2021).*

Tsai, Properties of novel polyimides containing bismaleimide and cyclic phosphine oxide, 2009, J Polym Res, 16:673-680. (Year: 2009).*

Stenzenberger, Chemistry and properties of addition polyimides, in "Polyimides", Wilson et al (Eds), Springer Science+Business Media New York 1990, pp. 79-128. (Year: 1990).*

Iredale, Modern advances in bismaleimide resin technology: A 21st century perspective on the chemistry of addition polyimides, 2017, Progress in Polymer Science, vol. 69, pp. 1-21. (Year: 2017).*

Vlot (ed), Fibre Metal Laminates An Introduction, 2001, Springer-Science+Business Media, B.V., pp. 1-25, 111-115, 416. (Year: 2001).*

J. Mahy, et al., The Relation Between Carbon-Fibre Surface Treatment and the Fibre Surface Microstructure, Surface and Interface Analysis, vol. 21 (1994), pp. 1-13.

Bing Xu, et al., Surface Modification of Polyacrylonitrile-based Carbon Fiber and Its Interaction with Imide, Applied Surface Science, vol. 253 (2006), pp. 2695-2701.

Pierre-Luc Girard-Lauriault et al., Surface Functionalization of Graphite and Carbon Nanotubes by Vacuum-ultraviolet Photochemical Reactions, Applied Surface Science, vol. 258 (2012), pp. 8448-8454.

Jyh-Ming Ting, et al., Passivation of Carbon Fiber by Diamond Deposition, Diamond and Related Materials, vol. 3 (1994), pp. 1249-1255.

Eduardo Humeres, et al., Reactivity of the Intermediates of the Reduction of SO2. Functionalization of Graphite, Graphite Oxide and Graphene Oxide, J. Phys. Org., vol. 27 (2014), pp. 344-351.

Jinyong Lee, et al., Surface Characterization and Adhesion of Carbon Fibers to Epoxy and Polycarbonate, International Journal of Adhesion & Adhesives, vol. 25 (2005), pp. 389-394.

L. H. Hihara, et al., Suppressing Galvanic Corrosion in Graphite/Aluminum Metal-Matrix Composites, Corrosion Science, vol. 34, No. 4 (1993), pp. 655-665.

Bo Xiang, et al., Hexavalent Chromium Induced Tunable Surface Functionalization of Graphite, RSC Adv., vol. 6 (2016), pp. 58354-58362.

Dhiraj Prasai, et al., Graphene: Corrosion-Inhibiting Coating, ACS Nano, vol. 6, No. 2 (2012), pp. 1102-1108.

Ikram Morcos, et al., Kinetic Studies of the Oxygen-Peroxide Couple, Technical Report No. 22, Office of Naval Research, Dec. 1, 1968, 51 pp.

Jianping Li, et al., Instant Modification of Graphite Nanosheets by the Grafting of a Styrene Oligomer Under Microwave Radiation, Journal of Applied Polymer Science, vol. 109 (2008), pp. 1377-1380.

M. Collaud Coen, et al., Functionalization of Graphite, Glassy Carbon, and Polymer Surfaces with Highly Oxidized Sulfur Species by Plasma Treatments, Journal of Applied Physics, vol. 92, No. 9 (2002), pp. 5077-5083.

(56) References Cited

OTHER PUBLICATIONS

Guohui Zhang, et al., Molecular Functionalization of Graphite Surfaces: Basal Plane versus Step Edge Electrochemical Activity, Journal of the American Chemical Society, vol. 136 (2014), pp. 11444-11451.

A. Kozawa, et al., Effects of Various Additives in the Electrolyte on Oxygen Reduction at Ferric Phthalocyanine-Catalyzed Graphite Electrode, J. Electrochem. Soc., Oct. 1971, pp. 1705-1709.

Gregory G. Wildgoose, et al., Characterising Chemical Functionality on Carbon Surfaces, Journals of Materials Chemistry, vol. 19 (2009), pp. 4875-4886.

Raghu Srinivasan, et al., Development of Guidelines to Attenuate Galvanic Corrosion Between Mechanically-Coupled Aluminum and Carbon-Fiber Reinforced Epoxy Composites Using Insulation Layers, Journal of The Electrochemical Society, vol. 162, No. 10 (2015), pp. C545-C554.

Toby Sainsbury, et al., Covalent Carbene Functionalization of Graphene: Toward Chemical Band-Gap Manipulation, ACS Appl. Mater. Interfaces, vol. 8 (2016), pp. 4870-4877.

A. L. G. Prette, et al., Polycarbosilazane Passivation on Graphite Foil Used as Gasket Seal, IOP Conf. Series: Materials Science and Engineering, vol. 47 (2013), 7 pp.

Alan Baker, et al., Composite Materials for Aircraft Structures, American Institute of Aeronautics and Astronautics, Oct. 8, 2004, pp. 1-11, 64-67, and 364.

Takashi Okazoe, et al., Alkylidenation of Ester Carbonyl Groups by means of a Reagent Derived from $RCHBr_2$, Zn, $TiCl_4$, and TMEDA. Stereoselective Preparation of (Z)-Alkenyl Ethers, Journal of Organic Chemistry, vol. 52, No. 19 (1987), pp. 4410-4412.

Kazuhiko Takai, et al., A Novel Catalytic Effect of Lead on the Reduction of a Zinc Carbenoid with Zinc Metal Leading to a Geminal Dizinc Compound. Acceleration of the Wittig-Type Olefination with the $RCHX_2$—$TiCl_4$—Zn Systems by Addition of Lead, Journal of Organic Chemistry, vol. 59, No. 10, (1994), pp. 2668-2670.

European Patent Office, Communication pursuant to Article 94(3) EPC for Application 18 200 363.2-1107 dated Mar. 31, 2022.

\* cited by examiner

COMPOSITIONS WITH COATED CARBON FIBERS AND METHODS FOR MANUFACTURING COMPOSITIONS WITH COATED CARBON FIBERS

FIELD

Aspects of the present disclosure provide compositions including coated carbon fibers, metal substrates having compositions disposed thereon, vehicle components having a metal substrate, methods for manufacturing a vehicle component by contacting a carbon fiber material with a carbon-containing zinc-titanium or a thiol and depositing a composition of the present disclosure onto a metal substrate.

BACKGROUND

Coatings that prevent metal corrosion are of importance in many industries. Metal corrosion costs U.S. industries more than $200 billion annually. Metal surfaces are important in aircraft design because they offer improved toughness as compared to ceramics. Advanced joining techniques such as laser and friction welding, automated riveting techniques, and high-speed machining also make metallic structures more affordable than ceramics.

Corrosion of a metal surface can be inhibited or controlled by introducing a protective layer onto the metal surface. Fibers, such as carbon fibers, are used in material coating layers on aircraft because of their strength. However, when carbon fibers, such as graphite, from composites come in contact with an active metal material, such as aluminum, corrosion can be initiated through a galvanic interaction where oxygen reduced at the graphite surface encourages corrosion/oxidation of the metal surface.

To ameliorate this interaction, the metal is separated from the carbon fiber coating using one or more insulating fiberglass layers, typically containing glass/epoxy or aramid/epoxy. However, use of fiberglass barriers increases cost of material, fabrication costs, production rate losses, and increases the weight of the overall structure it becomes a part of, such as an aircraft.

There is a need for carbon fiber coatings that do not promote corrosion of a metal substrate and methods for manufacturing vehicle components having carbon fiber coatings disposed thereon.

SUMMARY

The present disclosure provides a composition including a carbon fiber material comprising one or more of an acyclic olefin group or thiol; and a thermosetting polymer or a thermoplastic polymer.

In other aspects, a metal substrate includes a composition of the present disclosure disposed thereon. A vehicle component can include a metal substrate of the present disclosure.

The present disclosure further provides a method for manufacturing a vehicle component including contacting a carbon fiber material with a carbon-containing zinc-titanium or a thiol to form a coated carbon fiber material; and mixing the coated carbon fiber material with a thermosetting polymer or a thermoplastic polymer to form a composition.

In other aspects, a method includes depositing a composition of the present disclosure onto a metal substrate.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
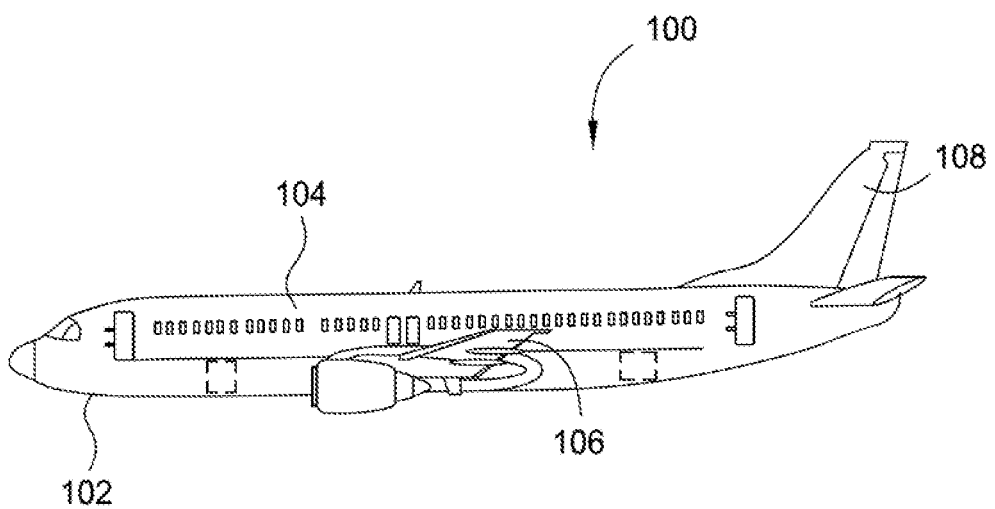
FIG. 1 is an aircraft comprising vehicle components according to one aspect.

The present disclosure provides compositions including a thermosetting or thermoplastic polymer and a coated graphite fiber. The present disclosure further provides metal substrates having a composition of the present disclosure disposed thereon. As used herein, a metal substrate includes pure metal substrates and metal-containing substrates. Methods for manufacturing metal structures include contacting (e.g., passivating) a carbon fiber (such as graphite) with a carbon-containing zinc-titanium or a thiol, mixing the coated carbon fiber with a thermosetting or thermoplastic polymer to form a composition, and depositing the composition onto a metal substrate. As used herein, "composition" includes a mixture of components (such as a carbon fiber material and a thiol) and/or the reaction product(s) of the components. Compositions and methods of the present disclosure provide corrosion inhibition of a metal substrate and, in aspects where the metal substrate is an aircraft component, a composition disposed on a metal substrate without the need for an intermediate fiberglass layer between the metal substrate and the composition. Without being bound by theory, compositions of the present disclosure can provide a coating that inhibits oxygen reduction of a metal substrate by bonding the coating on the surface of the carbon fiber to form a passivated carbon fiber. The passivated carbon fiber provides a barrier to electron transfer to the metal substrate. Carbon fiber coatings can covalently bond to the carbon fiber, unlike conventional approaches, such as fiberglass intermediate layers, that focus on blocking corrosion/oxidation occurring on the metal surface. This solution solves the galvanic process by inhibiting the oxygen reduction reaction.

Compositions and Metal Substrates

Compositions of the present disclosure include one or more carbon fiber materials and one or more polymers. The carbon fiber materials have one or more acyclic olefin groups or thiols disposed thereon (e.g., covalently bonded to the carbon fiber material or non-covalently interacting with the carbon fiber material). Carbon fiber material includes carbon fibers and carbon fiber composites. A composite is solid material having at least two phase-separated constituents with differing intrinsic properties. For example, a composite can be a three dimensional structure of fibers, such as carbon fibers, comingled together (e.g. woven), can be unidirectional tape, or can be a single ply of material. A composite has a composite structure selected from a mat, a tow, a laminate (a layered structure or a ply), a braid, or a filament. Carbon fibers include graphite, graphene, or carbon nanotubes. In at least one aspect, a carbon fiber is graphite.

A polymer of the present disclosure includes at least one of a thermosetting polymer or a thermoplastic polymer. In at least one aspect, a polymer is at least one of an epoxy, a bismaleimide, a polyimide, or a polyaryletherketone (such as a polyetheretherketone or a polyetherketone). Epoxies are thermosets that can provide durable coatings on a component, such as a vehicle component, such as an aircraft component. Bismaleimide resins have desirable formability and mechanical properties similar to epoxies and can operate at higher temperatures than epoxies. Polyaryletherketones are thermoplastics that can provide adhesion of a composition of the present disclosure to a component and can also withstand chemical, thermal, and physical conditions experienced by a vehicle if the component is a vehicle component. Polyimides have higher strains to failure than thermoset polymers because thermoplastic polymers can undergo plastic deformation.

In at least one aspect, a composition of the present disclosure includes the carbon fiber material from about 1 wt % to about 80 wt %, such as from about 20 wt % to about 75 wt %, such as from about 50 wt % to about 70 wt %, such as from about 60 wt % to about 65 wt %, based on the total weight of the composition. In at least one aspect, a composition of the present disclosure includes a polymer from about 1 wt % to about 99 wt %, such as from about 5 wt % to about 60 wt %, such as from about 30 wt % to about 60 wt %, such as from about 40 wt % to about 50 wt %, for example about 35 wt %, based on the total weight of the composition. The carbon fiber material of the present disclosure provides strength to the composition.

In at least one aspect, a metal substrate includes a composition of the present disclosure disposed thereon. Metal substrates include steel, aluminum, titanium, magnesium, tantalum, copper, and alloys thereof. A composition can be disposed on a metal substrate, where the composition has a thickness of from about 1 micron to about 1 millimeter, such as from about 1 micron to about 100 microns, such as from about 1 micron to about 10 microns. The thickness of a composition of the present disclosure disposed on a substrate can be sufficiently thin so as not to add significant weight to the coated substrate but nonetheless provide an adequate amount of composition to provide other benefits, such as corrosion protection of the substrate. A metal substrate can be, or form a component of, a vehicle component. A vehicle component is a component of a vehicle, such as a structural component, such as landing gear(s), a panel, or joint, of an aircraft. Examples of a vehicle component include a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

FIG. 1 is an aircraft comprising vehicle components, according to at least one aspect of the present disclosure. As shown in FIG. 1, aircraft 100 includes an aircraft structure 102 including vehicle components such as an elongated body 104, a wing 106 extending laterally from the body 104, and a tail 108 extending longitudinally from the body 104. Compositions of the present disclosure can be disposed on one or more surfaces of these aircraft components to form one or more aircraft component(s) having a composition disposed thereon.

Alternatively, compositions of the present disclosure can be disposed on one or more surfaces of wind turbines, satellites, or other vehicles such as cars, trains, boats, and the like.

Carbon Fiber Formation

Figure 2:
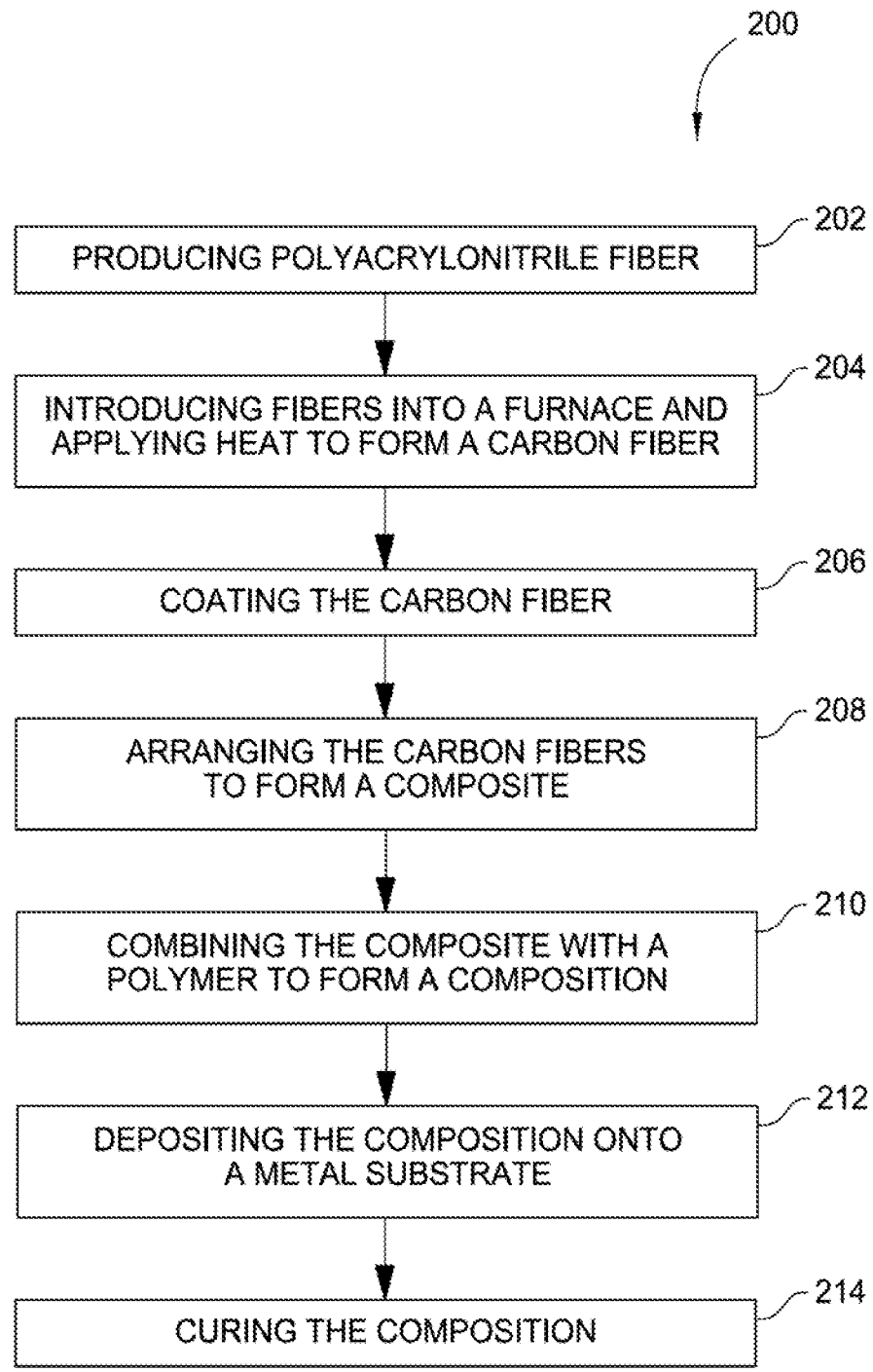
FIG. 2 is a flow diagram of a method for manufacturing components having passivated carbon fiber coatings, according to one aspect.

Fibers of the present disclosure include graphene, graphite, and carbon nanotubes. In at least one aspect, a carbon fiber is graphite. FIG. 2 is a flow diagram of a method 200 for manufacturing components, such as vehicle components, having passivated graphite fiber-containing coatings disposed thereon. Graphite can be produced from a polyacrylonitrile fiber. As shown at block 202, method 200 includes producing polyacrylonitrile (PAN) (an acrylic textile fiber) by wet spinning or dry spinning of the PAN polymer. Dry spinning produces round smooth fibers whereas wet spinning (extrusion into a coagulating bath) produces a variety of "non-circular" cross-sections, including dog-bone, elliptical, and kidney-shaped cross-sections. These non-circular cross-sections provide larger relative surface area to improve effective bonding. The fibers can be stretched during the spinning process. The greater the stretch, the smaller the fiber diameter and the higher the preferred orientation of the molecular chain along the fiber axis, resulting in a stiffer carbon fiber when processed. PAN fiber tows can contain from about $10^3$ fibers to about $10^5$ fibers, for example about $10^4$ fibers. To form the carbon fibers (e.g., graphite), PAN is first stabilized in air at about 250° C. by oxidation. At this point, PAN has a glass transition temperature (Tg) sufficient to resist melting at higher temperatures. The fibers are maintained under tension during the stabilization to prevent them from contracting during oxidation and, through the resulting deformation, to align further into a ladder structure with the fiber axis. The material is then carbonized at a temperature from about 1200° C. to 1600° C. in an atmosphere, such as inert gas, such as a nitrogen. As this heat treatment proceeds, benzene aromatic rings link to form polynuclear aromatic fragments (e.g., a more graphite-like structure). Gradually the aromatic network transforms to mainly carbon atoms and becomes denser through cross-linking with the evolution of $N_2$ through open pores in the fiber. If the heat treatment is performed at 1500-1600° C., the strain capability of the fibers is then over 1.5% with an intermediate value of the Young's modulus of around 240 GPa.

If a higher modulus is desired, which will lower strength and strain capability of the fibers, the fibers can undergo a final graphitization stage of heat treatment. As shown at block 204, method 200 includes introducing the fibers into a furnace (such as a graphitization furnace) and heating the furnace to a temperature from about 2,000° C. to about 2,700° C., for example about 2500° C. The graphitization heat treatment can occur in an atmosphere, such as inert gas, such as argon, which reduces or prevents the formation of imperfections in the fiber. During this process, the aromatic carbon basal layer planes grow, by further coalescence of adjacent layers, resulting in an increase in planar orientation of the fiber into a fiber having a graphite morphology, and thus a more elastic modulus (e.g., from about 300 GPa to about 400 GPa, such as about 380 GPa), as compared to the fiber material that has not undergone this graphitization heat treatment. The carbon fibers produced herein can have a filament diameter of from about 1 μm to about 20 μm, such as about 8 μm and can form a tow (bundle of filaments) having from about $2 \times 10^4$ of filaments to about $3 \times 10^4$ of filaments, such as $2.5 \times 10^4$ of filaments. Carbon fibers of the present disclosure can have a thickness of from about 1 μm to about 1 mm, such as from about 1 μm to about 10 μm, and a density of from about 0.5 g/cm$^3$ to about 1 g/cm$^3$, such as about 0.7 g/cm$^3$.

Passivating Carbon Fiber

As shown at block 206, method 200 includes coating a carbon fiber. Coating the carbon fiber can include a zinc-titanium passivation process or a thiol passivation process.

Zinc-Titanium Passivation:

In a zinc-titanium passivation process, a carbon-containing zinc-titanium coating can be directly applied to a fiber surface. The coating can be applied as a surface finish or can react with carbonyl (C=O) groups on the fiber surface to form a fiber olefination product having one or more olefin groups, such as acyclic olefin groups. Because fibers, such as graphite, are often oxidized and contain carbonyl groups, zinc-titanium passivation provides reduction or elimination of a carbonyl group's contribution to galvanic corrosion of a metal surface.

In at least one aspect, an olefin group is represented by the structure

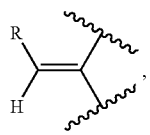

where R is hydrogen or a linear or branched $C_1$-$C_{40}$ alkane, such as a $C_1$-$C_{20}$ alkane, such as a $C_1$-$C_{10}$ alkane, such as a $C_1$-$C_5$ alkane. In at least one aspect, R is one or more of hydrogen, methyl, ethyl, n-propyl, isopropyl, n-butyl, sec-butyl, isobutyl, n-pentyl, sec-pentyl, isopentyl, n-hexyl, sec-hexyl, isohexyl, n-heptyl, sec-heptyl, isoheptyl, n-octyl, sec-octyl, isooctyl, n-nonyl, sec-nonyl, or isononyl.

In at least one aspect, a solution of TiCl$_4$ in dichloromethane can be added to tetrahydrofuran (THF). The concentration of TiCl$_4$ in the dichloromethane (before addition to the THF) can be from about 0.5M to about 2M, such as about 1M. "M" indicates molar concentration, i.e. moles per liter. The addition of TiCl$_4$ in dichloromethane to THF can be performed at a temperature of from about −10° C. to about 10° C., such as about 0° C., and/or under an inert atmosphere, such as nitrogen or argon. To this THF solution, N,N,N',N'-tetramethylethylenediamine (TMEDA) can be added at, for example, room temperature (e.g., 25° C.). This mixture can be stirred at room temperature for a period of time of about 5 minutes to about 1 hour, for example about 10 minutes. Elemental zinc, such as zinc dust, can then be added to the mixture and stirred at a temperature of from about 10° C. to about 40° C., such as about 25° C., for a period of time of from about 10 minutes to about 2 hours, such as about 30 minutes. In at least one aspect, a lead (Pb) catalyst is also added to the mixture (such as lead dichloride (PbCl$_2$)). The lead catalyst can be present in 0.1 mol % to about 5 mol % (based on the moles of the elemental zinc), such as from about 0.5 mol % to about 1 mol %.

Graphite and a dihaloalkane in THF are then added to the mixture and optionally stirred at a temperature of from about 10° C. to about 40° C., such as about 25° C., for a period of time of from about 10 minutes to about 4 hours, such as about 2 hours. A saturated solution of potassium carbonate (K$_2$CO$_3$) is then added to the mixture (to increase the pH of the mixture) at a temperature of from about −10° C. to about 10° C., such as about 0° C. and stirred for a period of time of from about 5 minutes to about 2 hours, such as about 15 minutes.

The mixture can then be diluted with ether and then passed rapidly through a plug of alumina with a pore size of about 0.5 microns using ether-triethylamine as elluent to provide purified graphite product. The graphite product is then concentrated and the residue purified by washing with solvent such as hexane and dichloromethane. Alternatively, the mixture can be dried and the graphite can be washed with hexane or dichloromethane and dried.

In at least one aspect, a dihaloalkane is represented by the structure: RCHX$_2$, where R is a linear or branched $C_1$-$C_{40}$ alkane, such as a $C_1$-$C_{20}$ alkane, such as a $C_1$-$C_{10}$ alkane, such as a $C_1$-$C_5$ alkane. Each X is independently fluoro, chloro, bromo, or iodo. In at least one aspect, each X is independently bromo or iodo. In at least one aspect, each X is bromo. In at least one aspect, a dihaloalkane is one or more of 1,1-dibromomethane, 1,1-dibromoethane, 1,1-dibromopropane, 1,1-dibromobutane, 1,1-dibromopentane, 1,1-dibromohexane, 1,1-dibromoheptane, 1,1-dibromooctane, 1,1-dibromononane, and 1,1-dibromodecane.

In at least one aspect, a method for passivating a carbon fiber material includes contacting a carbon fiber (e.g., graphite fiber) with a carbon-containing zinc-titanium. The method includes introducing a solution of TiCl$_4$ in dichloromethane to tetrahydrofuran (THF) to form a mixture at a temperature of from about −10° C. to about 10° C., such as about 0° C., and/or under an inert atmosphere, such as nitrogen or argon. The method includes introducing N,N,N',N'-tetramethylethylenediamine (TMEDA) to the mixture. The method includes stirring the mixture at room temperature for a period of time of about 5 minutes to about 1 hour, for example about 10 minutes. The method includes adding zinc, such as zinc dust, to the mixture and stirring the mixture for a period of time of from about 10 minutes to about 2 hours, such as about 30 minutes. The method can include introducing a lead (Pb) catalyst to the mixture. The method includes introducing graphite and a dihaloalkane to the mixture and optionally stirring the mixture at a temperature of from about 10° C. to about 40° C., such as about 25° C., for a period of time of from about 10 minutes to about 4 hours, such as about 2 hours. The method includes introducing a solution of potassium carbonate (K$_2$CO$_3$) to the mixture at a temperature of from about −10° C. to about 10° C., such as about 0° C. and optionally stirring the mixture for a period of time of from about 5 minutes to about 2 hours, such as about 15 minutes. The method includes diluting the mixture with a solvent, such as ether, and passing the mixture through a plug of alumina using an eluent, such as ether-triethylamine, to provide graphite product. The method can include washing the graphite product with a solvent such as hexane and dichloromethane.

In at least one aspect, a carbon fiber material comprises a coating disposed thereon, the coating comprising an acyclic olefin or reaction product of an acyclic olefin.

In at least one aspect, an olefin group is represented by the structure

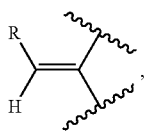

where R is hydrogen or a linear or branched $C_1$-$C_{40}$ alkane, such as a $C_1$-$C_{20}$ alkane, such as a $C_1$-$C_{10}$ alkane, such as a $C_1$-$C_5$ alkane. In at least one aspect, R is one or more of hydrogen, methyl, ethyl, n-propyl, isopropyl, n-butyl, sec-butyl, isobutyl, n-pentyl, sec-pentyl, isopentyl, n-hexyl, sec-hexyl, isohexyl, n-heptyl, sec-heptyl, isoheptyl, n-octyl, sec-octyl, isooctyl, n-nonyl, sec-nonyl, or isononyl.

Thiol Passivation:

In a thiol passivation process, a solution of a thiol compound can be directly applied to a fiber surface. The coating can be applied directly as a surface finish or can react with carbonyl (C=O) groups on the fiber surface to form a thiol-functionalized product having one or more thiol groups. If a thiol reacts with carbonyl groups on the fiber surface, the hydrogen atom of the thiol moiety of the thiol starting material is removed and the sulfur atom can bond to the fiber surface (such as covalently bond to the carbon atom of a carbonyl group of the fiber). Because fibers, such as graphite, are often oxidized and contain carbonyl groups, thiol passivation with a suitable thiol coating provides reduction or elimination of a carbonyl group's contribution to galvanic corrosion of a metal surface.

In at least one aspect, a thiol compound, such as a thiol corrosion inhibitor, is dissolved in a solvent. A solvent can be aqueous or organic. Organic solvents include alcohol (e.g., ethanol, n-propanol, isopropanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), or mixtures thereof.

The solution of thiol compound can be heated to a temperature of from about 20° C. to about 120° C., such as from about 40° C. to about 80° C., for example about 60° C. The fiber, such as a graphite rod, is introduced into the thiol-containing solution for a period of time of from about 10 minutes to about 6 hours, such as about 2 hours, and then removed from the thiol-containing solution. Alternatively, a thiol-containing solution is sprayed with a conventional spray gun onto the fiber, such as graphite, and cured at a temperature of from about 20° C. to about 120° C., such as from about 40° C. to about 80° C., for example about 60° C.

Thiol compounds of the present disclosure are compounds having one or more thiol moieties. Metal aircraft surfaces can comprise steel or can be an alloy having a major component, such as aluminum, and a minor component, known as an intermetallic. Intermetallics, for example, often contain copper metal which is prone to corrosion. Without being bound by theory, in addition to a thiol group's ability to reduce or eliminate galvanic corrosion, it is believed that the interaction of thiol moieties with copper-containing intermetallics on a metal surface (such as an aluminum alloy surface) prevents corrosion of the metal surface. More specifically, interaction of the thiol groups of a passivated fiber of the present disclosure with the intermetallics blocks reduction of the intermetallics by slowing the rate of oxygen reduction and decreasing oxidation of a metal alloy, such as an aluminum alloy.

In at least one aspect, a thiol compound of the present disclosure is an organic compound that includes a disulfide group and/or a thiolate group (e.g., a metal-sulfide bond). In at least one aspect, a thiol compound is represented by the formula: $R^1$—$S_n$—X—$R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, in at least one aspect, thiol compounds include polymers having the formula —($R^1$—$S_n$—X—$R^2$)$_q$—, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole.

In at least one aspect, a thiol compound includes a metal in a metal-thiolate complex. Thiol compounds can include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula M-S—$R^1$, wherein M is a metal and $R^1$ is an organic group. $R^1$ can include a disulfide group. Metal-thiolate complexes have the general formula M-(S—$R^1$)$_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

In at least one aspect, the thiol compound includes an azole, which can provide elimination of oxygen reduction and prevent corrosion of a surface. Examples of suitable azoles include cyclic compounds having 1 nitrogen atom, such as pyrroles, 2 or more nitrogen atoms, such as pyrazoles, imidazoles, triazoles, tetrazoles and pentazoles, 1 nitrogen atom and 1 oxygen atom, such as oxazoles and isoxazoles, and 1 nitrogen atom and 1 sulfur atom, such as thiazoles and isothiazoles. Nonlimiting examples of suitable azole-containing thiol compounds include 2,5-dimercapto-1,3,4-thiadiazole, 1H-benzotriazole, 1H-1,2,3-triazole, 2-amino-5-mercapto-1,3,4-thiadiazole, also named 5-amino-1,3,4-thiadiazole-2-thiol, 2-amino-1,3,4-thiadiazole. In at least one aspect, for example, the azole may be 2,5-dimercapto-1,3,4-thiadiazole. In some embodiments, the azole-containing thiol compound includes benzotriazole and/or 2,5-dimercapto-1,3,4-thiadiazole.

Thiol compounds of the present disclosure include heterocyclic thiol and amines, which can provide elimination of oxygen reduction and prevent corrosion of a surface. Heterocyclic thiols include thiadiazoles having one or more thiol moieties. Non-limiting examples of thiadiazoles having one or more thiol moieties include 1,3,4-thiadiazole-2,5-dithiol and thiadiazoles represented by formula (I) or formula (II):

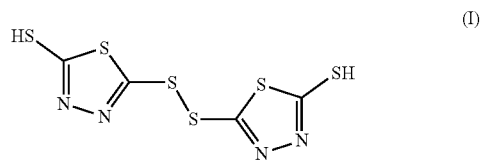

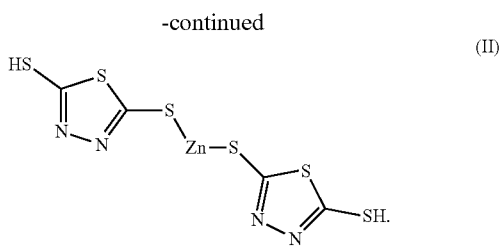

(II)

The thiadazole of formula (I) may be purchased from Vanderbilt Chemicals, LLC (of Norwalk, Connecticut) and is known as Vanlube® 829. The thiadiazole of formula (II) may be purchased from WPC Technologies, Inc.™ (of Oak Creek, Wisconsin) and is known as InhibiCor™ 1000.

A thiol compound of the present disclosure can be a derivative of 2,5-dimercapto-1,3,4 thiadiazole represented by HS—CN$_2$SC—SH or "DMTD", and of selected derivatives of trithiocyanuric acid ("TMT") which can be used for application as a corrosion inhibitor in connection with a paint. Examples include 2,5-dimercapto-1,3,4 thiadiazole (DMTD), and 2,4-dimercapto-s-triazolo-[4,3-b]-1,3-4-thiadiazole, and trithiocyanuric acid (TMT). Other examples include N-,S- and N,N-, S,S- and N,S-substituted derivatives of DMTD such as 5-mercapto-3-phenil-1,3,4-thiadiazoline-2-thione or bismuthiol II (3-Phenyl-1,3,4-thiadiazolidine-2,5-dithione) and various S-substituted derivatives of trithiocyanuric acid. Other examples include 5,5' dithio-bis (1,3,4 thiadiazole-2(3H)-thione or (DMTD)$_2$, or (DMTD), a polymer of DMTD; 5,5' thio-bis (1,3,4 thiadiazole-2(3H)-thione; or (TMT)$_2$, the dimer and polymers of TMT. Other examples include salts of DMTD of the general formula: M(DMTD)$_n$, where n=1, 2 or 3, and M is a metal cation such as M=Zn(II), Bi(III), Co(II), Ni(II), Cd(II), Pb(II), Ag(I), Sb(III), Sn(II), Fe(II), or Cu(II) (examples: ZnDMTD, Zn(DMTD)$_2$, Bi(DMTD)$_3$); similar salts of TMT, as for example, ZnTMT, in a ratio of 1:1; and, also, the comparable soluble Li(I), Ca(II), Sr(II), Mg(II), La(III), Ce(III), Pr(III), or Zr(IV) salts. Additional examples include salts of (DMTD), of general formula M[(DMTD)$_n$]$_m$, where n=2 or n>2, m=1, 2, or 3 and M is a metal cation such as M=Zn(II), Bi(III), Co(II), Ni(II), Cd(II), Pb(II), Ag(I), Sb(III), Sn(II), Fe(II), or Cu(II). Typical examples are: Zn[(DMTD)$_2$], Zn[(DMTD)$_2$]$_2$.

Additional examples include ammonium-, aryl-, or alkylammonium salts of DMTD, (DMTD)$_n$, or 5,5' thio-bis (1,3,4 thiadiazole-2(3H)-thione or 2,4-dimercapto-s-triazolo-[4,3-b]-1,3-4-thiadiazole. Typical examples include: Cyclohexyl amine: DMTD, in ratios of 1:1 and 2:1; Di-cyclohexyl amine: DMTD, in ratios of 1:1 and 2:1; Aniline: DMTD, in ratios of 1:1 and 2:1; similar salts of TMT, such as Di-cyclohexyl amine: TMT, in a ratio of 1:1. Additional examples include poly-ammonium salts of DMTD or (DMTD)$_n$ and TMT formed with polyamines.

Additional examples include inherently conductive polyaniline doped with DMTD or (DMTD)$_2$ or 5,5' thio-bis (1,3,4 thiadiazole-2(3H)-thione and TMT; Inherently conductive polypyrrole and/or polythiophene doped with DMTD, (DMTD)$_2$ and 5,5' thio-bis (1,3,4 thiadiazole-2(3H)-thione and/or TMT.

Additional examples include micro or nano composites of poly DMTD/polyaniline, poly DMTD/polypyrrole, and poly DMTD/polythiophene; similar micro or nano composites with TMT; and with 5,5' thio-bis (1,3,4 thiadiazole-2(3H)-thione; DMTD or salts of DMTD or derivatives of DMTD and of TMT, as organic constituents of various pigment grade inorganic matrixes or physical mixtures. In some aspects, such inorganic matrixes include anionic and cationic species with corrosion inhibitor properties, such as: MoO$_4^-$, PO$_4^-$, HPO$_3^-$, poly-phosphates, BO$_2^-$, SiO$_4^-$, NCN$^-$, WO$_4^-$, phosphomolybdate, phosphotungstate and respectively, Mg, Ca, Sr, La, Ce, Zn, Fe, Al, Bi.

Additional examples include DMTD or salts of DMTD or derivatives of DMTD and TMT in encapsulated forms, such as: inclusions in various polymer matrices, or as cyclodextrin-inclusion compounds or in microencapsulated form.

Pigment grade forms of DMTD include Zn(DMTD)$_2$ and Zn-DMTD (among other organic and inorganic salts of the former) with inorganic products or corrosion inhibitor pigments, include: phosphates, molybdates, borates, silicates, tungstates, phosphotungstates, phosphomolybdates, cyanamides or carbonates of the previously specified cationic species, as well as oxides. Examples include: zinc phosphate, cerium molybdate, calcium silicate, strontium borate, zinc cyanamide, cerium phosphotungstate, ZnO, CeO$_2$, ZrO$_2$, and amorphous SiO$_2$.

In at least one aspect, a method for passivating a carbon fiber material includes contacting a carbon fiber (e.g., graphite fiber) with a thiol. The method includes contacting a solution of thiol compound with the carbon fiber at a temperature of from about 20° C. to about 120° C., such as from about 40° C. to about 80° C., for example about 60° C. for a period of time of from about 10 minutes to about 6 hours, such as about 2 hours to form a coated carbon fiber. The method includes removing the coated carbon fiber from the solution. The method includes curing the coated carbon fiber at a temperature of from about 20° C. to about 120° C., such as from about 40° C. to about 80° C., for example about 60° C. Alternatively, the method includes spraying the solution onto the fiber.

In at least one aspect, a carbon fiber material comprises a coating disposed thereon, the coating comprising a thiol group/compound or reaction product of a thiol group/compound.

Fiber Composite Formation

At block 208, method 200 includes arranging the passivated fiber into a composite containing the fibers. A composite has a composite structure selected from a mat, a tow, a laminate (a layered structure or a ply), a braid, or a filament. A composite is arranged during manufacture of the vehicle component with the fibers oriented in one or more directions in sufficient concentrations to provide a desired strength and stiffness. Fiber tows can be woven to produce a fabric, such as a plain weave or satin weave cloth. For in-plane loading, a laminated or plywood type of construction is used including layers or plies of unidirectional or bi-directional orientated fibers. Alternatively, the fibers are arranged by one or more textile techniques, such as weaving, braiding, or filament winding.

Thus, to obtain the desired mechanical properties of a fiber, the fiber layers or plies in a laminate are arranged at angles from about 0° to about 90° relative to a 0° primary loading direction. In at least one aspect, a fiber mat has a combination of 0°, +/−45° C., and 90° C. orientations, which reduces or prevents distortion of the component after cure and under service loading. The laminate is stiffest and strongest (in-plane) in the direction with the highest concentration of 0° fibers, and the laminate is said to be orthotropic.

When the ply configuration is made of equal numbers of plies at 0°+/−60° or 0°, +/−45°, and 90°, the in-plane mechanical properties do not vary much with loading direction and the composite is then said to be quasi-isotropic.

Because the quasi-isotropic configuration has a stress concentration factor similar to that of an isotropic material, it is also used where local stresses are high, such as in a mechanical joint.

In at least one aspect, a fiber composite is cowoven with one or more additional fibers/composites. Additional fibers include glass or aramid fibers. In at least one aspect, one or more additional fibers are woven in the 0° or warp direction (the roll direction) or in the 90° (weft) direction.

In at least one aspect, forming a fiber composite includes holding a carbon fiber in a stationary position using a knitting yarn during weaving to avoid fiber crimping (waviness). These non-crimp fabrics can contain fibers orientated at 0°, 90°, and +/−45° in any desired proportions. Because of the reduction or elimination in fiber waviness, composites based on non-crimp fabric show a significant improvement in compression strength compared with those based on woven materials. Stiffness in both tension and compression is also increased by about 10% as compared with composites based on woven materials.

Composition and Component Formation

At block 210, method 200 includes combining the fiber composite with a polymer to form a composition of the present disclosure. Combining includes infiltrating a carbon fiber or carbon fiber composite of the present disclosure with a liquid polymer that is then cured/solidified (e.g., by heating or cooling) to form a continuous solid matrix. For example, a thermoset is cured by heating or a thermoplastic is crystallized by cooling. Alternatively, single fibers or a composite of fibers (e.g., tows of fibers or sheets of aligned fibers) is coated or intermingled with solid polymer or polymer precursor and the composition formed by flowing the coatings together (and curing if required) under heat and pressure.

A polymer is a thermosetting or thermoplastic polymer. Thermosetting polymers are long-chain molecules that cure by cross-linking to form a three dimensional network which does not readily melt or reform. These polymers can provide fabrication of compositions at relatively low temperatures and pressures because they pass through a low-viscosity stage before polymerization and cross-linking (if any). In at least one aspect, a polymer is at least one of an epoxy, a bismaleimide, or a polyaryletherketone (such as a polyetheretherketone or a polyetherketone). Epoxies are thermosets that can provide durable coatings on a component, such as a vehicle component, such as an aircraft component. Bismaleimide resins have desirable formability and mechanical properties similar to epoxies and can operate at higher temperatures than epoxies. Polyaryletherketones are thermosets that can provide adhesion of a composition of the present disclosure to a component and can also withstand chemical, thermal, and physical conditions experienced by a vehicle if the component is a vehicle component. Polyimides have higher strains to failure than thermoset polymers because thermoplastic polymers can undergo plastic deformation.

Epoxies have sufficient mechanical properties for use as aircraft coatings, have low shrinkage and form adequate bonds to fibers. Epoxies pass through a low-viscosity stage during the cure, which provides the use of liquid resin-forming techniques such as resin-transfer molding. Compositions comprising epoxies that cure at 120° C. and 180° C. can have upper service temperatures of about 100° C. to about 150° C.

Bismaleimide resins have desirable formability and mechanical properties similar to epoxies and can operate at higher temperatures than epoxies. Compositions comprising bismaleimide that cure at about 200° C. can have upper service temperatures above 180° C.

A polymer of the present disclosure can be a thermoplastic polymer. Thermoplastic polymers are linear (non-cross-linked) polymers that can be melted and reformed. High-performance thermoplastics for use as aircraft coatings include polyaryletherketone polymers such as polyetheretherketone which can be cured up to about 120° C., polyetherketone which can be cured up to about 145° C., and polyimide which can be cured up to about 270° C. Thermoplastic polymers are advantageous because they have higher strains to failure than thermoset polymers because thermoplastic polymers can undergo plastic deformation.

Because thermoplastic polymers are already polymerized, they can form very high viscosity liquids when melted. Fabrication techniques can be based on resin-film (or resin-fiber) infusion and pre-preg techniques. The fibers are coated with the polymer (from a solvent solution) and the resulting part is then consolidated under high temperature and pressure. Alternatively, sheets of thermoplastic film can be layered between sheets of dry fiber or fibers of thermoplastic can be woven through the fibers (such as carbon fibers) and the composite consolidated by hot pressing. Furthermore, because thermoplastics absorb very little moisture, they have better hot/wet property retention than thermosetting composites, but do involve higher temperature processing.

The polymer of the present disclosure forms the shape of the composition and can transfer load into and out of the fibers, can separate the fibers so adjacent fibers are protected if one fails, and/or can protect the fiber from the surrounding environment. The fiber can interact with (e.g., bond to) the polymer to provide toughness to the overall composition. The location(s) where the fiber interacts with the polymer is known as the interface or interphase.

Combining a fiber or fiber composite with a polymer to form a composition of the present disclosure includes impregnating or coating (e.g., dipping or spraying) a fiber (or fiber composite) with a liquid polymer to form a mixture that is then cured. This can be referred to as resin-transfer molding and can be used, for example, if the polymer has a low-viscosity (e.g., less than 1,000 centipoise (cps)).

Alternatively, combining a fiber (or fiber composite) with a polymer to form a composition of the present disclosure includes infusing a melted polymer film into a fiber (or fiber mat) under pressure and then curing. This can be referred to as resin-film infusion.

Alternatively, combining a fiber (or fiber composite) with a polymer to form a composition of the present disclosure includes pre-impregnating fiber sheet bundles or tows with a liquid resin (pre-preg) for subsequent arrangement (stacking) followed by consolidation and cure under temperature and pressure. For thermoset composites starting at room temperature, the temperature can be increased up to a temperature of about 350° F.), the pressure of the environment is increased (e.g., up to about 200 psi), and the high temperature, high pressure condition is maintained for up to several hours depending on the material, then is allowed to cool to room temperature/ambient pressure.

In at least one aspect, a plurality of cured compositions (e.g., fibers impregnated or coated with a liquid polymer) are stacked and consolidated at a temperature from about 250° F. to about 600° F. to form a consolidated composition.

In at least one aspect, as shown at block 212, method 200 includes depositing a composition of the present disclosure onto a metal substrate. Metal substrates include steel, aluminum, titanium, magnesium, tantalum, copper, and alloys thereof. Depositing can include any suitable "lay up" process or "collation" process known in the art. For example, a composition of the present disclosure can be cut to match the shape of a metal substrate and deposited onto the metal. The deposited composition is "debulked" by placing the deposited composition in a vacuum bag and pulled to a pressure of 980 mbar or greater for a time period from about 1 minute to about 30 minutes. The composition can be deposited as tiles or as a continuous piece. A breather material can be used and can connect to the vacuum ports of the vacuum bag.

At block 214, the composition is cured, to fabricate a part, such as a coated vehicle component of an aircraft. In at least one aspect, a composition of the present disclosure is cured at a temperature from about 20° C. to about 300° C., such as from about 100° C. to about 200° C. A vehicle component is any suitable component of a vehicle, such as a structural component, such as landing gear(s), a panel, or joint, of an aircraft, etc. Examples of a vehicle component include a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Figure 3:
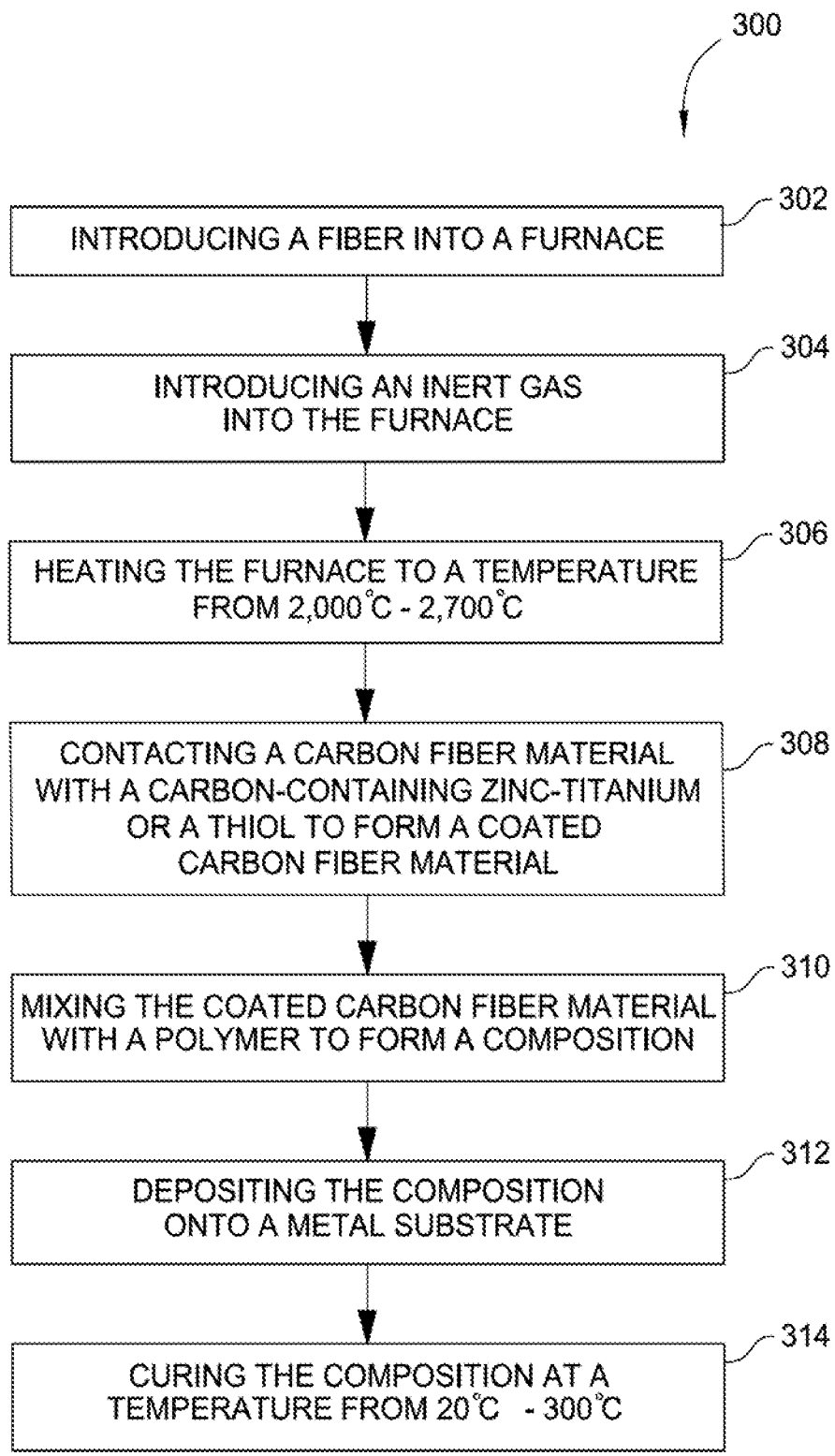
FIG. 3 is a flow diagram of a method for manufacturing components having passivated graphite fiber-containing coatings disposed thereon.

FIG. 3 is a flow diagram of a method 300 for manufacturing components having passivated graphite fiber-containing coatings disposed thereon. As shown in FIG. 3, method 300 includes introducing a fiber into a furnace (Block 302), introducing an inert gas into the furnace (Block 304), and heating the furnace to a temperature from about 2,000° C. to about 2,700° C. (Block 306). Method 300 includes contacting the carbon fiber material, such as graphite, with a carbon-containing zinc-titanium or a thiol to form a coated carbon fiber material (Block 308). Method 300 includes mixing the coated carbon fiber material with a polymer selected from a thermosetting polymer or a thermoplastic polymer to form a composition (Block 310). Method 300 includes depositing the composition onto a metal substrate (Block 312). Method 300 includes curing the composition at a temperature from about 20° C. to about 300° C. (Block 314).

EXAMPLES

Passivated fibers were evaluated electrochemically by placing the fiber in an electrolyte (phosphate buffered saline (PBS)) and scanning the potential for indication of oxygen reduction current. The ratio of the current measured (nanoamps to microamps depending on the area of the electrode) to the current of a graphite fiber without passivation will yield a passivation efficiency. This ratio tells how effective the coating is to blocking the current.

Example 1

1.54 grams of 2,5-Dimercapto-1,3,4-thiadiazole (DMcT, Acros) was dissolved in isopropanol (IPA). This solution was heated to 60° C. with stirring. A graphite rod (e.g., 3.2 mm diameter) (abraded with Struers silicon carbide p120 KH emery paper) was introduced into the above heated solution for about 2 hours and removed. An air-dried electrode was introduced into a solution containing 3.5% pH 7 PBS Buffer. About 8 mm of the passivated graphite rod was then introduced into the PBS solution. Electrochemical experiments (cyclic voltammetry 20 mV/s vs. SCE) were then performed to verify oxygen reduction reaction inhibition of a 4.2×0.9 cm strip of 5056 A8 aluminum alloy.

Cyclic Voltammetry

Figure 4:
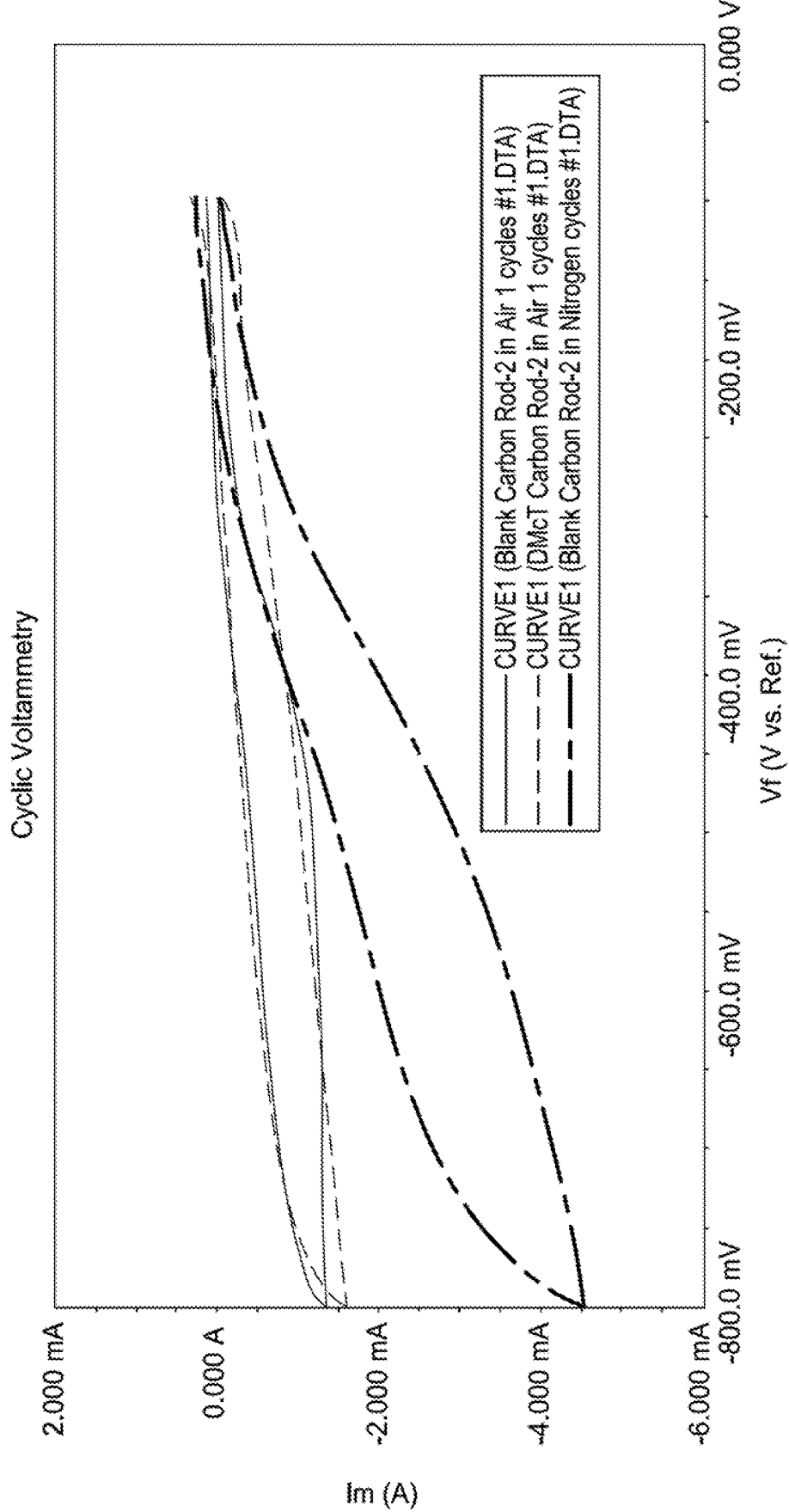
FIG. 4 is a graph illustrating amperes versus volts for (1) a blank carbon rod in air, (2) a blank carbon rod under nitrogen, and (3) a DMcT passivated carbon rod in air, according to one aspect.

The cyclic voltammetry of passivated graphite fibers was assessed using a Gamry Reference 600 from Gamry Instruments of Warminster, Pennsylvania. The scan rate was 20 mV/s, a step size of 1 mV, an electrode area of 1 $cm^2$, and equilibration time of 100 seconds, a max current of 1 mA, and 1 cycle. FIG. 4 is a graph illustrating amperes versus volts for (1) a blank carbon rod in air, (2) a blank carbon rod under nitrogen, and (3) the DMcT passivated carbon rod in air. As shown in FIG. 4, the DMcT passivated carbon rod in air has a very similar cyclic voltammetric signal as the blank carbon rod under nitrogen. These data indicate that oxygen reduction has been eliminated.

Galvanic Corrosion Scan

The galvanic corrosion of passivated graphite fibers was assessed in a cyclic corrosion chamber according to ASTM G85 using a Gamry Potentiostat. Run time was 750 seconds, the sample period was 8 seconds, and limit current was 25 $mA/cm^2$. The potentiostat is turned on with an applied potential of zero volts. This assures that the two metal specimens are at the same potential. After a delay of one sample period, a current reading and a potential reading are taken. The potential that is recorded is the difference between the working electrode and the reference electrode. After another delay, the next readings are taken. This process of delaying and taking readings was continued until the Run Time parameter is exceeded. After each point the current range was automatically switched to the optimal range for the measured cell current.

Figure 5:
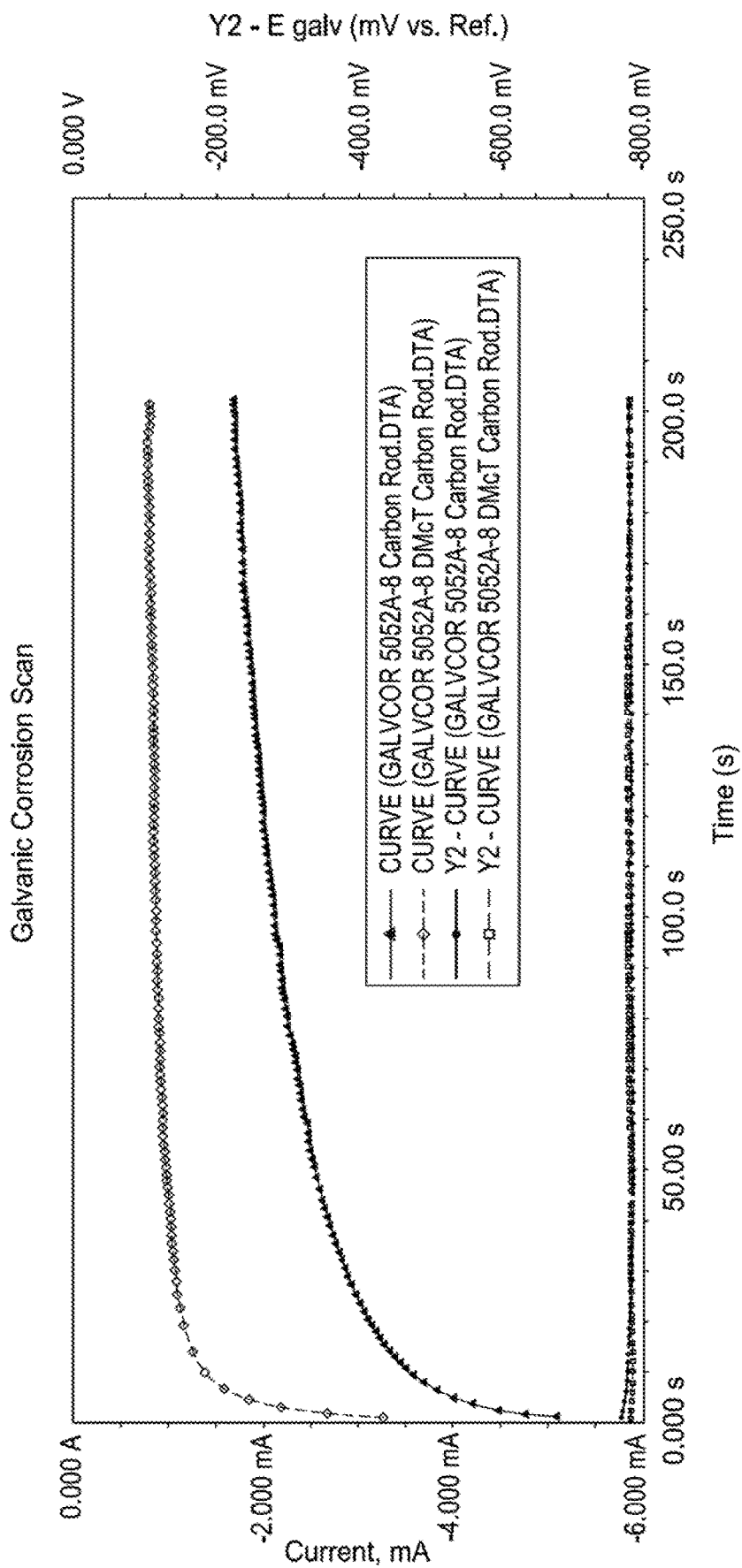
FIG. 5 is a graph illustrating a Galvanic Corrosion Scan for (1) a blank carbon rod, and (2) a DMcT passivated carbon rod, according to one aspect.

FIG. 5 is a graph illustrating a Galvanic Corrosion Scan for (1) a blank carbon rod, and (2) the DMcT passivated carbon rod. As shown in FIG. 5, the thiol passivated carbon fiber provides corrosion reduction by at least a factor of two as compared to the blank carbon fiber (−0.80 mA versus −1.70 mA). Y2 indicates the galvanic potential difference between the aluminum and the graphite. The larger the difference, the greater the galvanic corrosion current.

Overall, compositions and methods of the present disclosure provide corrosion inhibition of a metal substrate and, in aspects where the metal substrate is an aircraft component, a composition disposed on a metal substrate without the need for an intermediate fiberglass layer between the metal substrate and the composition, which reduces the weight of the aircraft from hundreds to thousands of pounds (lbs).

Definitions

The term "alkyl" includes a substituted or unsubstituted, linear or branched acyclic alkyl radical containing from 1 to about 20 carbon atoms. In at least one aspect, alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, and structural isomers thereof.

The term "cycloalkyl" includes a substituted or unsubstituted, cyclic alkyl radical containing from 1 to about 20 carbon atoms.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO— wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

The term "ether" is an oxygen atom bridging two carbon atoms.

The term "amino" refers to a moiety represented by the structure —$NR_2$, where each R is independently hydrogen, alkyl, acyl, heteroalkyl, aryl, cycloalkyl, heteroaryl, or heterocycloalkyl.

The term "thione" refers to a moiety represented by the structure —$CR_2$—(C=S)—$CR_2$—, where each R is independently hydrogen, alkyl, acyl, heteroalkyl, aryl, cycloalkyl, heteroaryl, or heterocycloalkyl.

The term "heterocyclyl" refers to a monocyclic, bicyclic or tricyclic ring having up to 10 atoms in each ring, wherein at least one ring is aromatic and contains from 1 to 4 heteroatoms in the ring selected from N, O and S. Non-limiting examples of heterocyclyl include pyridyl, thienyl, furanyl, pyrimidyl, imidazolyl, pyranyl, pyrazolyl, thiazolyl, thiadiazolyl, isothiazolyl, oxazolyl, isoxazoyl, pyrrolyl, pyridazinyl, pyrazinyl, quinolinyl, isoquinolinyl, benzofuranyl, dibenzofuranyl, dibenzothiophenyl, benzothienyl, indolyl, benzothiazolyl, benzooxazolyl, benzimidazolyl, isoindolyl, benzotriazolyl, purinyl, thianaphthenyl, pyrazinyl, azole, triazole, thiazole, dithiazole, and thiadiazole. Attachment of heterocyclyl can occur via an aromatic ring or through a non-aromatic ring or a ring containing no heteroatoms.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A metal substrate comprising a composition disposed thereon, the composition comprising:
   a carbon fiber composite comprising:
      one or more carbon fibers having one or more acyclic olefin groups bonded thereto, the acyclic olefin being represented by the structure:

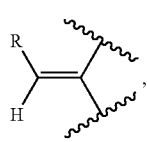

wherein R is hydrogen or a linear or branched $C_1$-$C_{40}$ alkane and the unsaturation shown in the structure is bonded directly to the carbon fiber; and
   a polymer comprising a bismaleimide,
wherein the metal substrate is a component of an aircraft and the composition is disposed directly on the metal substrate at a thickness of about 1 micron to about 10 microns.

2. The metal substrate of claim 1, wherein the carbon fiber composite has a composite structure selected from a mat, a tow, a layered structure, a ply, a braid, or a filament.

3. The metal substrate of claim 2, wherein the carbon fiber composite comprises graphite.

4. The metal substrate of claim 2, wherein the composition comprises the polymer from about 30 wt % to about 60 wt % based on the total weight of the composition.

5. The metal substrate of claim 4, wherein the composition comprises the carbon fiber composite from about 50 wt % to about 70 wt % based on the total weight of the composition.

6. The metal substrate of claim 2, wherein the carbon fiber has orientations comprised of about 0°, about +/−45°, and about 90°.

7. The metal substrate of claim 2, wherein the composition comprises the polymer from about 40 wt % to about 50 wt % based on total weight of the composition.

8. The metal substrate of claim 2, wherein the composition comprises the carbon fiber composite from about 50 wt % to about 70 wt % based on total weight of the composition.

9. The metal substrate of claim 2, wherein the composition comprises the carbon fiber composite from about 60 wt % to about 65 wt % based on total weight of the composition.

10. The metal substrate of claim 9, wherein the composition comprises the polymer from about 30 wt % to about 60 wt % based on total weight of the composition.

11. The metal substrate of claim 1, wherein the metal substrate is steel, aluminum, titanium, magnesium, tantalum, copper, or an alloy thereof.

12. The metal substrate of claim 1, wherein the metal substrate is a component of an aircraft selected from the group consisting of a rotor blade, a landing gear, an auxiliary power unit, a nose of an aircraft, a fuel tank, a tail cone, a panel, a coated lap joint between two or more panels, a wing-to-fuselage assembly, a structural aircraft composite, a fuselage body-joint, and a wing rib-to-skin joint.

13. The metal substrate of claim 1, wherein R of the one or more acyclic olefin groups is the linear or branched $C_1$-$C_{20}$ alkane.

14. A method, comprising:
   introducing a carbon fiber composite to a dihaloalkane, zinc, titanium tetrachloride, and a lead dichloride catalyst to form a coated carbon fiber comprising one or more acyclic olefin groups represented by the structure:

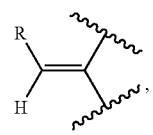

wherein R is hydrogen or a linear or branched $C_1$-$C_{40}$ alkane and the unsaturation shown in the structure is bonded directly to the carbon fiber;

mixing the coated carbon fiber composite with a bismaleimide polymer to form a composition;

depositing the composition onto a metal substrate; and curing the composition at a temperature of about 20° C. to about 300° C. to form a cured carbon fiber composite having a thickness of about 1 micron to about 10 microns disposed directly on the metal substrate, wherein the metal substrate is a component of an aircraft.

15. The method of claim 14, wherein the metal substrate is steel, aluminum, titanium, magnesium, tantalum, copper, or an alloy thereof.

16. The method of claim 14, wherein the carbon fiber composite comprises graphite, and the method further comprises:

introducing a fiber into a furnace;

introducing an inert gas into the furnace; and heating the furnace to a temperature of about 2,000° C. to about 2,700° C. to form the graphite.

17. The method of claim 14, wherein the carbon fiber composite has a composite structure selected from a mat, a tow, a layered structure, a ply, a braid, or a filament.

18. The method of claim 14, wherein mixing the coated carbon fiber composite with the bismaleimide polymer is performed by resin-transfer molding or resin-film infusion to form the composition.

19. The method of claim 14, wherein depositing the composition onto the metal substrate is performed by a lay-up process or a collation process.

20. The method of claim 14, wherein R of the one or more acyclic olefin groups is the linear or branched $C_1$-$C_{20}$ alkane.

* * * * *